US011657095B1

(12) United States Patent
Wu et al.

(10) Patent No.: US 11,657,095 B1
(45) Date of Patent: May 23, 2023

(54) SUPPLEMENTAL CONTENT PLACEMENT FOR NATURAL LANGUAGE INTERFACES

(71) Applicant: Amazon Technologies, Inc., Seattle, WA (US)

(72) Inventors: Felix Xiaomeng Wu, Seattle, WA (US); Shyam Sunder Kumar, Seattle, WA (US); Daniel Paludi, Seattle, WA (US); Pablo Carballude Gonzalez, Seattle, WA (US); Manish Dutt Sharma, Sammamish, WA (US); Luying Pan, Seattle, WA (US); Rongzhou Shen, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 16/835,823

(22) Filed: Mar. 31, 2020

(51) Int. Cl.
*G10L 15/22* (2006.01)
*G06F 16/9032* (2019.01)
*G06F 16/9035* (2019.01)

(52) U.S. Cl.
CPC .... *G06F 16/90332* (2019.01); *G06F 16/9035* (2019.01); *G10L 15/22* (2013.01); *G10L 2015/228* (2013.01)

(58) Field of Classification Search
USPC ................................................ 704/7–10, 257
See application file for complete search history.

(56) References Cited

U.S. PATENT DOCUMENTS

| 2010/0088170 | A1* | 4/2010 | Glore, Jr. | G06Q 50/01 705/14.69 |
| 2010/0135637 | A1* | 6/2010 | McDermott | H04N 5/76 386/344 |
| 2010/0142915 | A1* | 6/2010 | McDermott | H04N 21/4722 386/343 |
| 2015/0160817 | A1* | 6/2015 | Hwang | G06F 16/9038 707/E17.014 |
| 2018/0040021 | A1* | 2/2018 | Pattan | H04W 4/21 |
| 2018/0047068 | A1* | 2/2018 | Brown | G06Q 30/02 |
| 2018/0367862 | A1* | 12/2018 | Horii | H04N 21/4826 |
| 2020/0175983 | A1* | 6/2020 | Goodman | G06F 16/36 |

* cited by examiner

*Primary Examiner* — Leonard Saint-Cyr
(74) *Attorney, Agent, or Firm* — Pierce Atwood LLP

(57) ABSTRACT

A system is provided for determining when supplemental content unresponsive to a user input is to be presented during a user interaction. The system determines an action, performance of which, may trigger output of supplemental content. The system may determine when, during a user interaction corresponding to performance of the action, supplemental content may be presented. The system may use constraint data indicating a device type via which the content may be presented, and a time duration during which the supplemental content may be presented. If the constraint data is satisfied, the system may determine to present the supplemental content.

19 Claims, 9 Drawing Sheets

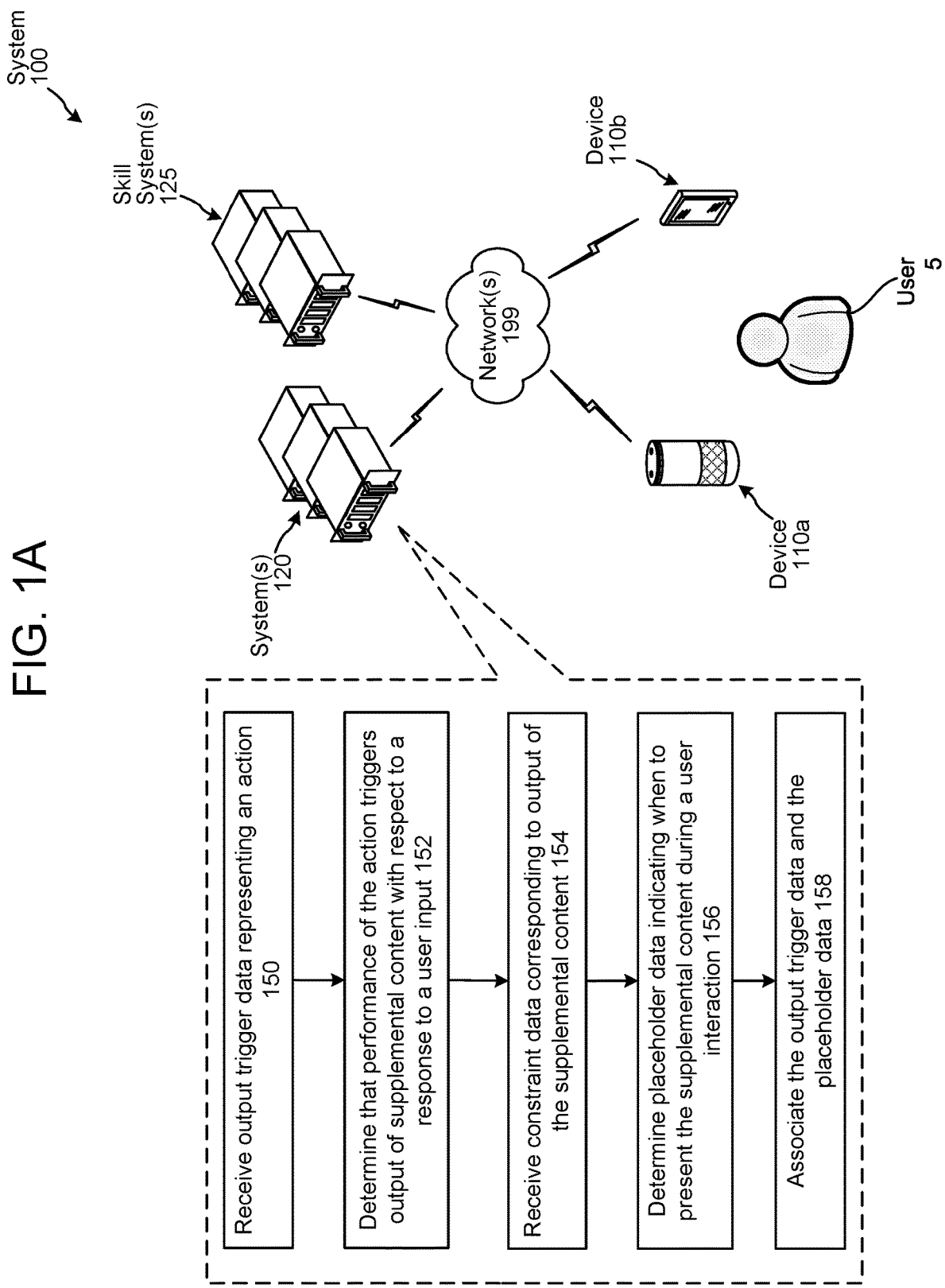

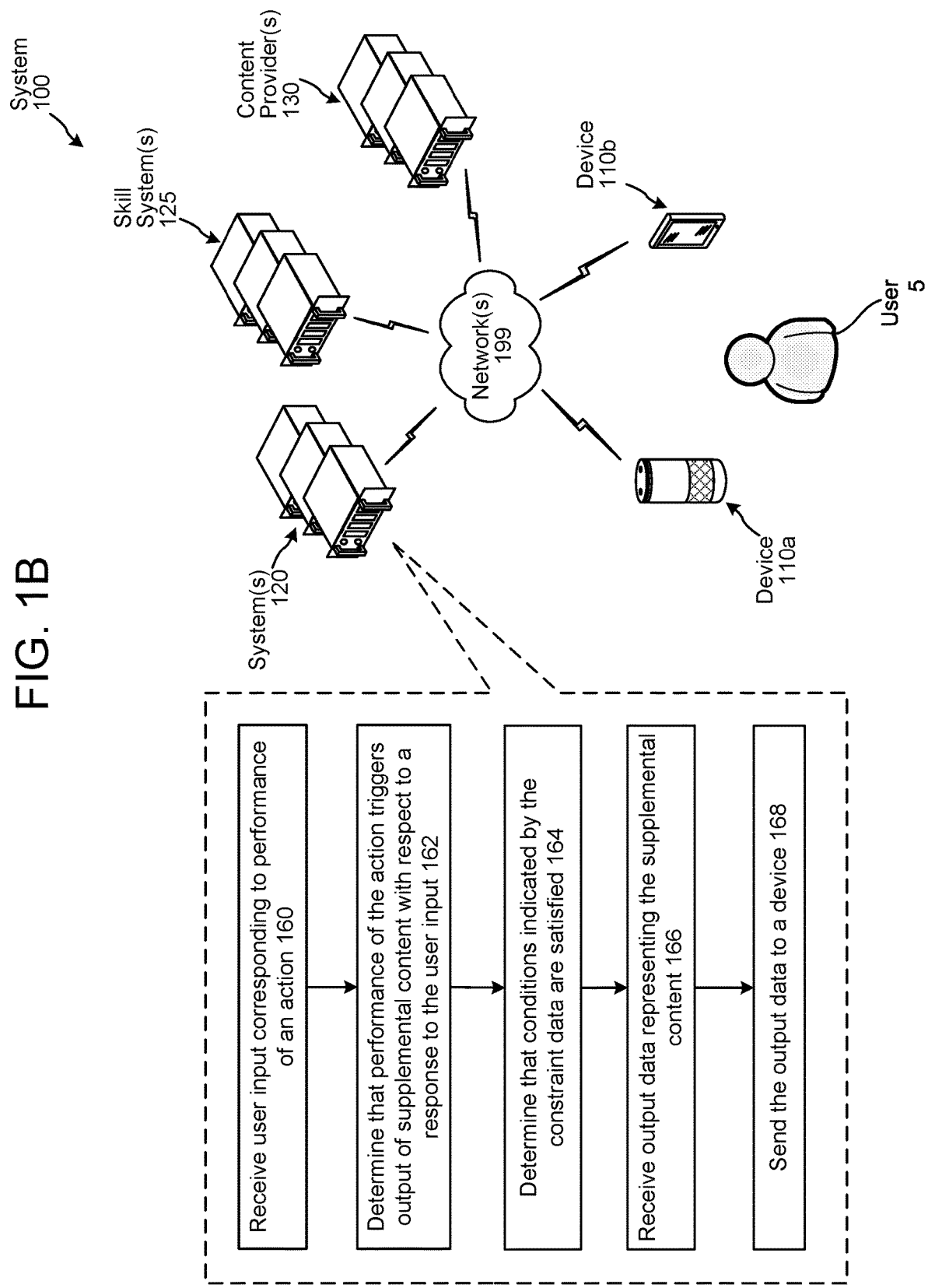

US 11,657,095 B1

SUPPLEMENTAL CONTENT PLACEMENT FOR NATURAL LANGUAGE INTERFACES

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as spoken language understanding. Spoken language understanding may also involve converting a user's speech into text data which may then be provided to various text-based software applications.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system for determining content placeholder data for an output trigger according to embodiments of the present disclosure.

FIG. 1B is a conceptual diagram illustrating a system for determining when content is presented according to embodiments of the present disclosure.

DETAILED DESCRIPTION

Figure 2:
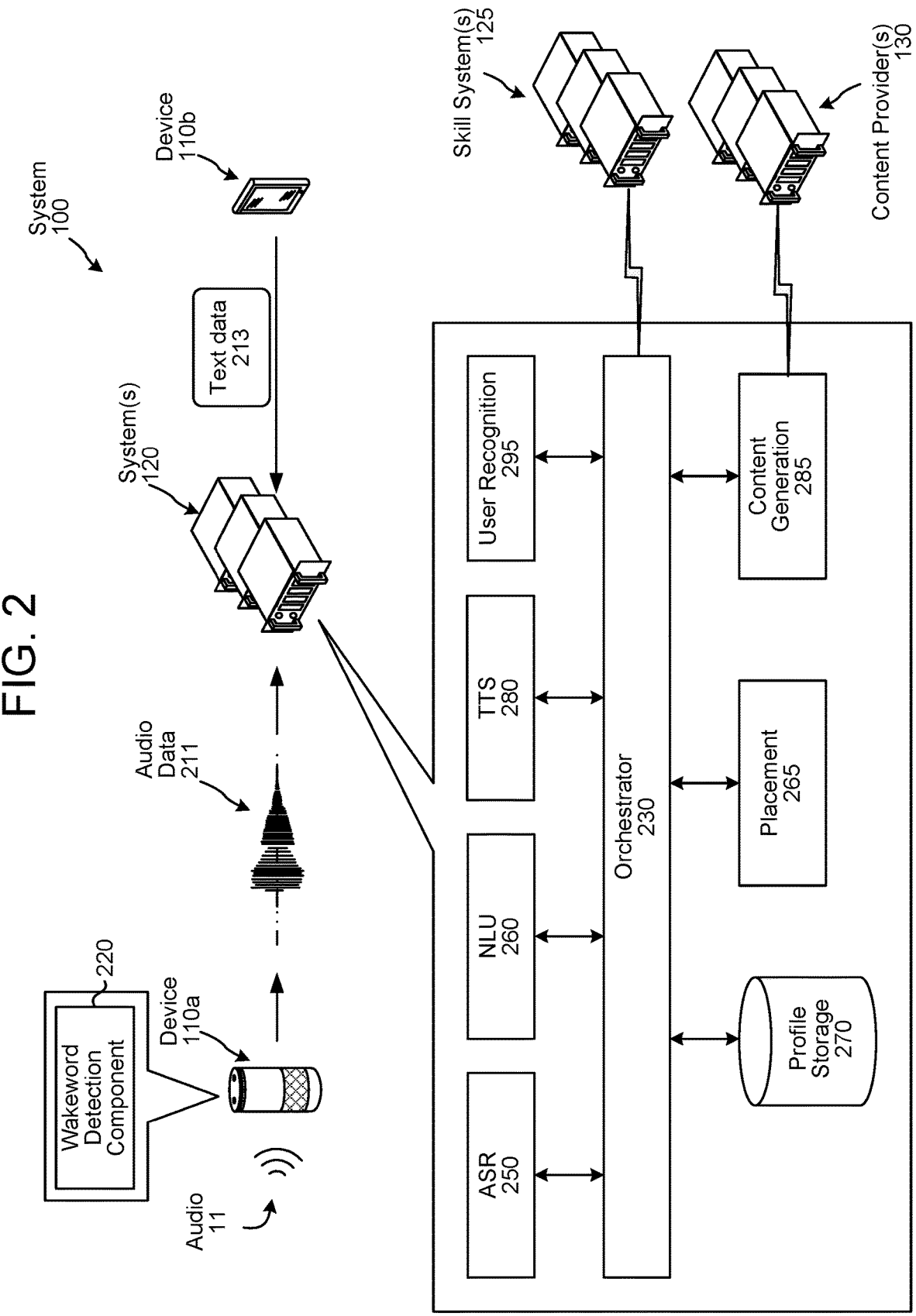
FIG. 2 is a conceptual diagram of components of the system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may perform a sequence of actions based on a user input. A user may request the system to perform two or more actions, or the system may determine to perform two or more actions in response to a user input. In some cases, the sequence of actions may be performed in response to a current user input. For example, the system may receive the user input "turn on the living room lights and play my music." In other cases, a user may request the system to perform the sequence of actions when a particular event occurs in the future. For example, the system may receive the user input "when I come home, turn on the living room lights and play my music." In both cases, the system may perform multiple actions responsive to the user input.

In at least some examples, the system may output certain content (e.g., supplemental content or injected content) that may be unresponsive to the user input. In certain instances this may be referred to as "supplemental content" as it is additional content that is system selected to be output to a user that is not necessarily responsive to the user input but is rather injected into an interaction between a user and the system. As a non-limiting list, examples of such supplemental content may include information related to a product the user may be interested in purchasing, recently published content that the user may be interested in listening to, information about a skill system the system determines the user may be interested in invoking using future natural language inputs, TTS speech telling the user to have a nice day, a request for user feedback or rating of the system or skill system, etc. In other words, the system may proactively recommend/output content to a user without the user expressly requesting such content.

The improved system of the present disclosure relates to determining when supplemental content is to be provided to the user. For example, the system may determine to provide supplemental content after the sequence of actions are performed, before the sequence of actions are performed, or in-between performance of two actions of the sequence. The system may include a placement component that determines when the supplemental content is to be output prior to execution of an action or sequence of actions. The system may generate a content placeholder to indicate when the supplemental content is to be output while performing action(s) responsive to the user input, and what type of supplemental content is to be output. The placement component may be responsible for determining content placeholders for different types of actions, for example, when a user completes an order, when a user asks for the weather, when a user interacts with a smart home device, when a system determines that the user is traveling, etc.

In determining the content placeholder, the system may use various factors, including data specified by a skill developer, data specified by a system administrator, user-specified data, the type of action(s), context data (relating to the action(s), the user input, the user interaction during a session, etc.), device type, optimization goals, and other data.

While supplemental content may be unresponsive to a user input, it is desirable for the supplemental content to enhance, rather than detract from, a user experience with the system. The system of the present disclosure may improve a user experience by providing a particular type of supplemental content to the user at a particular time during the user's interaction with the system.

For example, the system may not output supplemental content if the user has the device in 'do not disturb' mode, even though the user is interacting with the device. In another example, the system may determine to output supplemental content that is new engagement-focused (that may cause the user to engage with the system in new ways), determine to output supplemental content that is monetizable (that may cause the user to make further purchases) or determine to output supplemental content that is feedback-focused (that may request the user to provide a rating with respect to the user interaction).

A system may be configured to incorporate user permissions and may only perform activities and/or a subset of the activities disclosed herein if approved by a user. As such, the systems, devices, components, and techniques described herein could be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

As used herein, a user interaction may refer to when a user interacts with the system by providing a user input (e.g., in the form of an utterance or other type of voice input, text input or other type of keyboard input, touchscreen input, mouse clicks, gestures or other type of computer vision input, etc.) expecting an output(s) to be presented or an action(s) to be performed responsive to the user input. A user interaction may also refer to when a system generates an output(s) or performs an action(s) in response to an event occurring, rather than responding to a user input. In both cases, the system is interacting with the user by presenting an output or performing an action.

FIGS. 1A and 1B show a system 100 configured to determine when to present supplemental content during a user interaction. Although the figures and discussion of the present disclosure illustrate certain steps in a particular order, the steps described may be performed in a different order (as well as certain steps removed or added) without departing from the present disclosure. As shown in FIGS. 1A and 1B, the system 100 may include one or more devices (110a/110b) local to a user 5, a natural language processing (NLP) system(s) 120, a skill system(s) 125, and a content provider system(s) 130. As illustrated, the one or more devices (110a/110b), the system(s) 120, and the skill system(s) 125, may communicate across one or more networks 199. While the user 5 is illustrated as being a human, other types of users (e.g., computing systems) may exist. The skill system(s) 125 may implement functionality provided by one or more content provider(s) 130 (described in further detail with respect to FIG. 5), may be implemented as part of a skill system(s) 125, in at least some examples.

FIG. 1A is a conceptual diagram illustrating a system for determining content placeholder data for an output trigger according to embodiments of the present disclosure. FIG. 1B is a conceptual diagram illustrating a system for determining when content is presented according to embodiments of the present disclosure.

The system(s) 120 receives (150) output trigger data representing an action. The system(s) 120 may receive the output trigger data from one or more skill system(s) 125, and with a request to present content (supplemental content) unresponsive to a user input that requests performance of the action. For example, the skill system 125 may request the system(s) 120 to present supplemental content when a user requests weather information, or when a user interacts with a particular skill, etc. The system(s) 120 determines (152), based on the request from the skill system 125, that performance of the action should be set to trigger output content that is unresponsive to a user input.

The system(s) 120 receives (154) constraint data corresponding to output of the supplemental content. The constraint data may include one or more prohibitions on when and how supplemental content can be presented/outputted to the user 5. In other words, the constraint data may represent one or more criterion/conditions that when satisfied prevents/prohibits outputting of supplemental data during a particular session/interaction. As discussed below, the constraint data may be general regarding output of any supplemental content or may be specific to the specific supplemental content. The skill system 125 may provide the constraint data. The constraint data may indicate at least a device type and a time duration, where the device type corresponds to a device type via which the supplemental content may be presented, and the time duration indicates during which time the supplemental content may be presented.

The system(s) 120 determines (156) placeholder data indicating when to present the content during a user interaction. The placeholder data may also indicate how the supplemental content is to be presented. The placeholder data may be determined using the constraint data, user profile data, and other data to determine placement of the supplemental content during a user interaction. The system(s) 120 associates (158) the output trigger data and the placeholder data to enable the system(s) 120 to determine when supplemental content is to be presented during the user interaction. As used herein, a user interaction may refer to a user interacting with the system(s) 120 by providing an input via the device 110. A user interaction may also include the system(s) 120 performing an action/providing an output, where the system(s) 120 may be proactive and may not be responding to a user input. In some cases, the user may provide an input to receive an output or to perform an action in the future when an event occurs or a condition is satisfied, and the system(s) 120 may perform the action/provide the output accordingly.

The system(s) 120 receives (160) a user input corresponding to performance of an action. The user input may be provided by the user 5 via the device 110. The user input may be audio data representing an utterance from the user 5. In other cases, the user input may be in other forms, such as, text input, touchscreen input, gestures, etc. In some embodiments, the user input may request performance of an action, including request to receive an output or operate a device. In some embodiments, the user input may be a request to perform an action in the future when an event occurs.

The system(s) 120 determines (162), using the output trigger data and the placeholder data, that performance of the requested action triggers output of supplemental content/content that is unresponsive to the user input. The system(s) 120 may receive context data corresponding to the user input, where the context data may indicate a device type of the device that received the user input or the device that is performing the action. The system(s) 120 determines (164) that conditions indicated by the constraint data are satisfied. For example, the system(s) 120 may determine that the device type of the device type set to receive injected output matches the device type indicated in the constraint data. The system(s) 120 may determine that the time the user interaction is taking place is within the time duration indicated by the constraint data.

The system(s) 120 receives (166) output data representing the supplemental content. The system(s) 120 may request supplemental content from the skill system 125 or other sources, where the request may include a content type identifier. Details on how the system(s) 120 determines the supplemental content to be presented are described in connection with FIG. 5. The system(s) 120 sends (168) the output data to a device associated with the user 5. Using the placeholder data, the system(s) 120 may determine to output the supplemental content after or before the output data responsive to the user input is presented. Details on how the system(s) 120 determines when to output the supplemental content are described in connection with FIG. 3.

In some embodiments, the system(s) 120 may determine an output/action responsive to the user input and may determine when the output data representing the supplemental content is to be presented, for example, before the output/action responsive to the user input or after the output/action responsive to the user input. The system(s) 120 may determine second/final output data that includes output data responsive to the user input and the output data representing the supplemental content.

In some embodiments, during a first time period the system(s) 120 may receive data from the skill system(s) 125 to determine placement of supplemental content during an interaction. During a second time period, subsequent to the first time period, the system(s) 120 may determine whether or not supplemental content is to be presented during the particular interaction.

Figure 4:
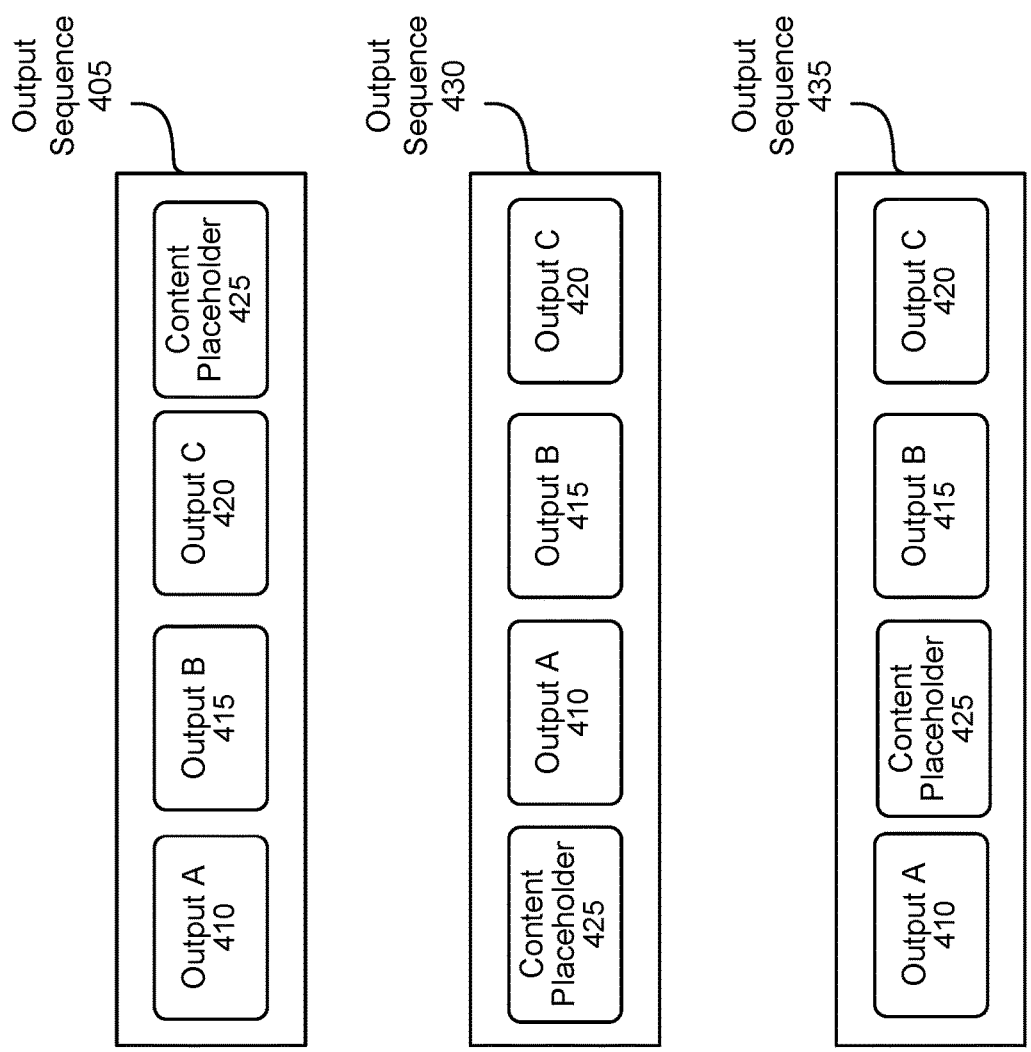
FIG. 4 illustrates example output sequences with a placement holder for supplemental content according to embodiments of the present disclosure.

The system(s) 120 determines to place/inject/insert supplemental content during an interaction between the user 5 and the system(s) 120, where the interaction involves performance of multiple (at least two) actions. An action comprises a discrete operation related to a particular output, which may be in response to a particular input. For example, a system outputting synthesized speech in response to a user input may be considered an action. In another example a system operating a device (e.g., turning on a light) may be considered an action. An action may be distinguished from another action based on the particular skill system/component or other type of component invoked/used to perform the action. For example, a first action may be operating a smart device in the home (which may use a Smart Home skill system), a second action may be playing music (which may use a music skill system), a third action may be playing a movie (which may use a movie skill system), etc. In other cases, an action may be distinguished from another action based on the respective actions corresponding to different intents and/or different slot values/entities. For example, a first action may be turning on the lights in a user's home (intent=turn on; slot value=lights), a second action may be closing the garage door (intent=close; slot value=garage door), a third action may be turning on the TV (intent=turn on; slot value=TV), etc. In some cases an action may be distinguished from another action based on a discrete task performed or a discrete output presented to the user. For example, a first action may be playing music using a first device, a second action may be playing music using a second device, etc. The system(s) 120 may determine to present supplemental content to the user before performing one or more such actions, after performing one or more such actions, or in-between performance of such actions. Performance of an action may be referred to as presenting/providing/generating output data. As shown in FIG. 4, various outputs are presented to the user, and these outputs may correspond to performance of an action.

The system 100 may operate using various components as described in FIG. 2. The various components may be located on a same or different physical devices. Communication between various components may occur directly or across a network(s) 199. In some embodiments, one or more the components (e.g., ASR component 250, NLU component 260, TTS component 280, etc.) described in relation to system(s) 120 may be implemented at a local device/user device (e.g., device 110) in addition to or instead of the system(s) 120.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the system(s) 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection could be performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once a wakeword is detected, the device 110a may "wake" and begin transmitting audio data 211, representing the audio 11, to the system(s) 120. The audio data 211 may include data corresponding to the detected wakeword, or the device 110a may remove the portion of the audio corresponding to the detected wakeword prior to sending the audio data 211 to the system(s) 120.

The system(s) 120 may include an orchestrator component 230 configured to receive the audio data 211 (and optionally and assistant identifier) from the device 110a. The orchestrator component 230 may send the audio data 211 to an ASR component 250.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the system(s) 120, wherein the text data 213 is received by the orchestrator component 230.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the system(s) 120, a skill system(s) 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent. The NLU component 260 may output NLU results data (which may include tagged text data, indicators of intent, etc.).

As described above, the system(s) 120 may perform speech processing using two different components (e.g., the ASR component 250 and the NLU component 260). One skilled in the art will appreciate that the system(s) 120, in at least some examples, may implement a spoken language understanding (SLU) component that is configured to process audio data 211 to generate NLU results data.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

The system(s) 120 may communicate with one or more skill systems 125. A skill system(s) 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system(s) 125 may operate in conjunction between the system(s) 120 and other devices, such as the device 110, in order to complete certain functions. Inputs to a skill system(s) 125 may come from speech processing interactions or through other interactions or input sources.

A "domain" may include various skills relating to a particular area of interest. For example, a music domain may include various skills that can respond to a user's request to play music, enable a user to purchase music, etc. Such skills may be the Amazon Music skill, the Pandora skill, the Spotify skill, etc. In another example, a smart-home domain may include skills that enable a user to control various home devices. A skill system(s) 125 may be associated with a domain. A non-limiting list of illustrative domains includes a smart home domain, a music domain, a video domain, a flash briefing domain, a shopping domain, and/or a custom domain.

The system(s) 120 may include a TTS component 280. The TTS component 280 may generate audio data (e.g., synthesized speech) from text data using one or more different methods. Text data input to the TTS component 280 may come from a skill system(s) 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system(s) 120 may include a user recognition component 295. In at least some examples, the user recognition component 295 may be implemented as a skill system(s) 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system(s) 125, as well as processing performed by other components of the system(s) 120 and/or other systems.

The system(s) 120 may include profile storage 270. The profile storage 270 may include a variety of information related to individual users, groups of users, devices, etc. that interact with the system(s) 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system(s) 125, the user is providing the system(s) 120 with permission to allow the skill system(s) 125 to execute with respect to the user's natural language inputs. If a user does not enable a skill system(s) 125, the system(s) 120 may not invoke the skill system(s) 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Referring back to FIG. 2, the system(s) 120 may additionally include a placement component 265 configured to determine when to output supplemental content during an output sequence responsive to a user input. The system(s) 120 may additionally include a content generation component 285 that may be invoked at runtime to determine what supplemental content is to be output in a specific situation. The placement component 265 and the content generation component 285 may use data provided by the orchestrator 230 to determine when to inject content. The content generation component 285 may use data provided by the content provider(s) 130 to determine what content to inject.

In some embodiments, the placement component 265 may determine, prior to performance of an action, when supplemental content can be provided based on the type of action, and then may determine during performance of an action if the supplemental content is to be provided based on context data relating to the user interaction.

Figure 3:
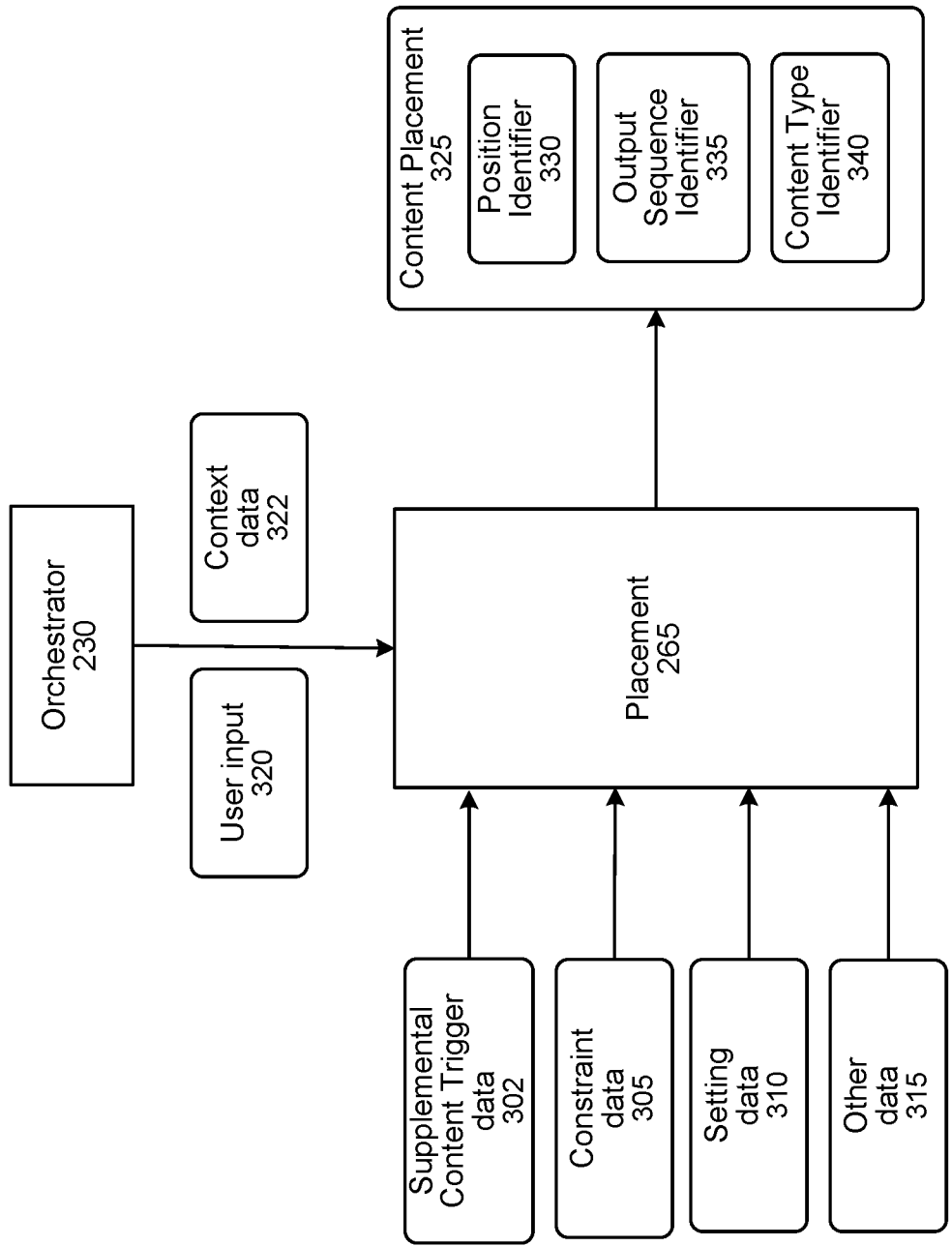
FIG. 3 is a conceptual diagram illustrating how a placement component may determine when to output supplemental content according to embodiments of the present disclosure.

FIG. 3 illustrates how the placement component 265 determines when supplemental content is to be output. The placement component 265 may determine when, during a sequence of output or actions that are to be presented or performed, to inject content. The placement component 265 may receive, from a skill system(s) 125, supplemental content trigger data 302, constraint data 305, settings data 310 and other data 315 to determine a content placement data 325. The orchestrator 230 may provide a user input data 320 and context data 322 to the placement component 265. The content placement data 325 may indicate a position or time when the supplemental content is to be output.

In some embodiments, the supplemental content trigger data 302 may indicate a type of output or action, execution of which, may cause the system(s) 120 to output supplemental content. The supplemental content trigger 302 may indicate, in broad terms, that supplemental content is to be provided when the output or action corresponds to a particular domain or skill. For example, the supplemental content trigger data 302 may indicate that supplemental content is to be provided when a user input corresponds to the weather skill (e.g., user input may be "what is the weather like today?" or "is it going to rain tomorrow?"). The supplemental content trigger 302 may indicate, in more specific terms, that supplemental content is to be provided when a particular output or action is performed. For example, the supplemental content trigger 302 may indicate a particular output/action that is responsive to when the user asks for today's new headlines, or when the user requests the system to make a restaurant reservation. In another example, the supplemental content trigger 302 may indicate a particular output/action, such as, when the system outputs weather information indicating rain, or when the system plays the user's music playlist. In these cases, the supplemental content trigger 302 may be represented in terms of intent, slot type, and slot values. Alternatively, the output trigger 302 may be represented as text data corresponding to the user request or the output to be generated.

In some embodiments, the supplemental content trigger 302 may indicate a sequence of actions, execution of which, may cause the system(s) 120 to output supplemental content. A user may request the system(s) 120 to perform a sequence of actions in response to a user input or in response to an event occurring in the future. For example, the user input may be "turn on the living room lights, play my playlist, and turn off the garage lights," "when I enter the house, turn on the living room lights, play my playlist, and turn off the garage lights," or "when the Seahawks game starts, turn on the TV and start the microwave to make popcorn." The supplemental content trigger 302 may indicate a sequence of actions as output A, output B, output C, etc., where output A may correspond to a first action to be performed, output B may correspond to a second action to be performed, and so on. As an example, for the user input "turn on the living room lights, play my playlist, and turn off the garage lights" or "when I enter the house, turn on the living room lights, play my playlist, and turn off the garage lights," the supplemental content trigger 302 may indicate {output A: "living room lights on", output B: "play playlist", output C: "turn off garage lights"}.

The constraint data 305 may represent one or more prohibitions/conditions on outputting supplemental content. The constraint data 305 may indicate a device type via which the supplemental content is allowed to be (or prohibited from being) provided. For example, the constraint data 305 may indicate that supplemental content is allowed via a smartphone or a voice-controlled device. The constraint data 305 may indicate that supplemental content is not allowed via a device that is associated with a child user (e.g., a tablet or mobile device specifically configured for children).

The constraint data 305 may indicate a time period during which supplemental content can (or cannot) be provided such as, between 8 am and 8 pm. The constraints data 305 may indicate during which time period supplemental content is not allowed, such as, between 8 pm and 8 am (when it is more likely that the user would rather receive content responsive to a user input and not receive unresponsive content).

The constraint data 305 may indicate a type of output that the supplemental content is limited to or may indicate one or more types of output that the supplemental content cannot be presented as. The types of output may be TTS output, audio output, video output, visual output, push notification, message (e.g., email, SMS, etc.), or other types of output. The constraint data 305 may indicate other information specifying the manner in which the output is to be presented. For example, the constraint data 305 may indicate that the supplemental content can be provided as synthesized speech (using TTS processing) and may not exceed a duration of audio output time or a number of characters.

The constraint data 305 may indicate a type of user for which the supplemental content can (or cannot) be provided, for example, the user must be an adult or the primary user in the household, or cannot be a child user. The constraint data 305 may also indicate that certain content is not to be output in the presence of specific types of users beyond a primary user associated with a device/profile. Thus if the system detects the presence of other users (for example by detecting the presence of other devices associated with the other users) the constraint data would prevent supplemental content from being output that corresponds to that particular constraint data.

The constraint data 305 may also be based on another user activity. For example, certain constraint data 305 may indicate that supplemental content is not to be output if the system determines the user is engaged in another activity (e.g., cooking, driving, sleeping, operating a power tool, etc.).

The constraint data 305 may also indicate that if supplemental content is currently being output but a condition arises that should constrain the supplemental content, whether the supplemental content may continue output until it is complete or whether the supplemental content should be interrupted and should stop right away. For example, if supplemental content is being output and the time changes to a window prohibiting output the system may allow the supplemental content to continue to completion but if supplemental content is being output and the user begins driving the supplemental content may terminate immediately. These settings may be adjusted according to user preferences, system preferences, or the like.

The constraint data 305 may also relate to other user information such as calendar data. For example, constraint data 305 may indicate that supplemental content should not be output during certain calendared events but may be permissible with others.

The constraint data 305 may be general regarding output of any supplemental content or may be specific to the specific supplemental content. For example, certain constraint data may indicate that no supplemental content is to be output under certain conditions (e.g., no supplemental content at all from 1 am-6 am). In another example, certain constraint data may indicate that certain types of supplemental content are prohibited under certain conditions (e.g., no news related supplemental content from 2 pm-4 pm).

The settings data 310 may indicate whether placement of the supplemental content is to be fixed or dynamic. If the settings data 310 indicates that the content placement should be dynamic, then the placement component 265 may determine placement of the supplemental content based on a particular user interaction, corresponding context data, and user profile data. For example, for a first user interaction corresponding to a first user profile and associated with performance of an action, the placement component 265 may determine that the supplemental content is to be presented after the output responsive to the user input is presented. For a second user interaction corresponding to the first user profile and associated with performance of the action, the placement component 265 may determine that the supplemental content is to be presented before the output responsive to the user input is presented. Thus, the content placement is determined on a dynamic-basis.

The user input data 320 may represent an input from a user that requests performance of an action. The user input data 320 may represent a current user input. In some cases, the user input data 320 may represent a past user input that requests performance of an action in the future when an event occurs. The user input data 320 may be a sequence of actions requested by the user to be performed.

The context data 322 may indicate data corresponding to the user input data 320. The content data 322 may include a device identifier and device type information for the device that received the user input or for the device that is presenting an output/performing an action responsive to the user input. The context data 322 may indicate an operating/output mode corresponding to a user profile, where the mode may be set to 'do not disturb' or a brief mode. During such modes, the placement component 265 may determine to not present any supplemental content.

The content placement data 325 may include a position identifier 330 indicating when the supplemental content may be presented. For example, the position identifier 330 may indicate that the supplemental content may be presented after output data responsive to the user input is presented. In another example, the position identifier 330 may indicate that the supplemental content may be presented before output data responsive to the user input is presented. In yet another example, the position identifier 330 may indicate that the supplemental content may be presented between first output data and second output data responsive to the user input is presented. The placement component 265 may determine the position identifier 330 using various factors.

The content placement data 325 may include an output sequence identifier 335 associated with an output sequence that indicates the order in which output data responsive to the user input and the supplemental content output is presented to the user. The content placement data 325 may also include a dialog session identifier corresponding to the user input 320 or the present interaction, so that the orchestrator 230 can determine that output for this particular interaction/dialog session may include supplemental content.

The content placeholder data 265 may include a content type identifier 340 associated with a content type that indicates which type of supplemental content is to be presented during the user interaction.

The placement component 265 determines when, during an interaction, supplemental content is to be presented. The placement component 265 may use the supplemental content trigger data 302, constraint data 305, setting data 310, other data 315, user input data 320 and context data 322 to determine when the supplemental content is to be presented. The placement component 265 may determine to present the supplemental content before or after performance of an action indicated by a skill system(s) 125 that is to trigger output of the supplemental content. For example, a skill system 125 may provide data indicating that supplemental content is to be presented after the system plays music.

The placement component 265 may determine to present the supplemental content before or after performance of an action that is related to the type of supplemental content to be presented. For example, a skill system 125 may indicate that the supplemental content relates to a recommendation for music, and the placement component 265 may determine to present the supplemental content before or after performance of an action that relates to music (e.g., playing music, purchasing music, creating a music playlist, displaying song lyrics, etc.). In another example, a skill system 125 may indicate that the supplemental content relates to a particular smart home device, such as a smart refrigerator, and the placement component 265 may determine to present the supplemental content before or after performance of an action using a smart refrigerator or another smart home device.

The placement component 265 may determine when to present the supplemental content based on optimization goal(s) specified by a skill system 125. The other data 315 may indicate one or more optimization goals of a skill system 125 in presenting supplemental content to a user. Example optimization goals may relate to achieving certain sale goals, such as, a particular number of orders per second, a particular number of product upsells, a particular type of product upsells, and the like. Example optimization goals may relate to achieving further engagement with a user, such as, receiving feedback from the user, engaging the user in other functionalities of the skill, increasing user satisfaction with the skill, and the like. The placement component 265 may determine to present the supplemental content before or after an action based on which placement and which action meets the optimization goal. For example, if the optimization goal is to increase product upsell, then the placement component 265 may determine to present supplemental content after an action of purchasing an item is performed. If the optimization goal is to increase user satisfaction with a skill, then the placement component 265 may determine to present the supplemental content before an action by the skill is performed, and the supplemental content may relate to providing the user instructions on how to interact with the skill (e.g., sample invocation phrases or commands).

In some embodiments, the placement component 265 can tune/configure the constraint data 305 in view of optimization goals (included in other data 315) indicated by the skill system 125. If an optimization goal to be achieved by presenting supplemental content is to increase engagement with the skill or a particular feature, then the placement component 265 may determine to disregard or change the prohibitions/conditions indicated by the constraint data 305 to enable increased engagement. For example, if the constraint data 305 indicates a time duration during which supplemental content can be presented, the placement component 265 may determine to present supplemental content outside of the time duration to increase engagement according to the optimization goal. In another example, if the constraint data 305 indicates a device type via which supplemental content can be presented, the placement component 265 may determine to present supplemental content via other device types as well to increase engagement according to the optimization goal.

The other data 315 may include candidate supplemental content types provided by a skill system 125. The candidate supplemental content type may be associated with an optimization goal. In an example, for an optimization goal of a number of orders per second, the supplemental content type may be a product recommendation (e.g., users also bought these items). For an optimization goal of increasing user engagement, the supplemental content type may be additional information on the skill.

The placement component 265 may determine when a user is most receptive to receiving supplemental content, whether that be before or after a particular action. For example, the placement component 265 may determine that a user is more receptive to supplemental content if presented before playing music.

The placement component 265 may determine to present supplemental content before or after particular action types. For example, the placement component 265 may determine to present supplemental content after an action that outputs audio and/or video (rather than an action that operates a device), and may present the supplemental content via the device 110 that outputs the audio/video. In this case, the system(s) 120 does not have to turn on/activate a device 110 to present the supplemental content, whereas if the action was operating a smart home device without a display, such as lights, than the system(s) 120 would have to turn on a display or speaker device to present the supplemental content.

The placement component 265 may implement primitives used to control presenting of unresponsive output/content to users, and may define both the spatial requirements of supplemental content placement, supplemental content generation requirements, and influence how downstream output occurs. A user who sets a device/user profile to DND (Do Not Disturb) between midnight and 4 AM will not receive any notifications between that time and all supplemental content placements may be suppressed by the placement component 265 during that time. While certain content/output may be generated during this time, the placement component 265 may not present supplemental content until after the specified do not disturb time.

FIG. 4 illustrates example output sequences with a placement holder for supplemental content. The output sequences 405, 430, 435 may be augmented or modified output sequences generated by the placement component 265 to insert a content placement data 325 for supplemental content. The content generation component 285 may determine what content to inject at the content placement data 325 during the output sequence. The output sequences 405, 430, 435 may be modified versions of the output sequence provided by the orchestrator 230 to the placement component 265.

As shown in FIG. 4, an example modified output sequence 405 may include the following sequence: output A 410, output B 415, output C 420, and content placement 325. In another example modified output sequence 430, the sequence may be: content placement 325, output A 410, output B 415, and output C 420. In another example modified output sequence 435, the sequence may be: output A 410, content placement 325, output B 415, and output C 420. As shown, the content placement 325 may be inserted at the end of the output sequence, at the beginning of the output sequence, or between two outputs in the sequence. The output A may correspond to performance of a first action, the output B may correspond to performance of a second action, and the output C may correspond to performance of a third action. Performance of an action may cause operation of a device (e.g., turning on lights, adjusting a thermostat), may cause output of data (e.g., audio data, video data, text data, email message, etc.) or may cause other types of actions/outputs.

Figure 5:
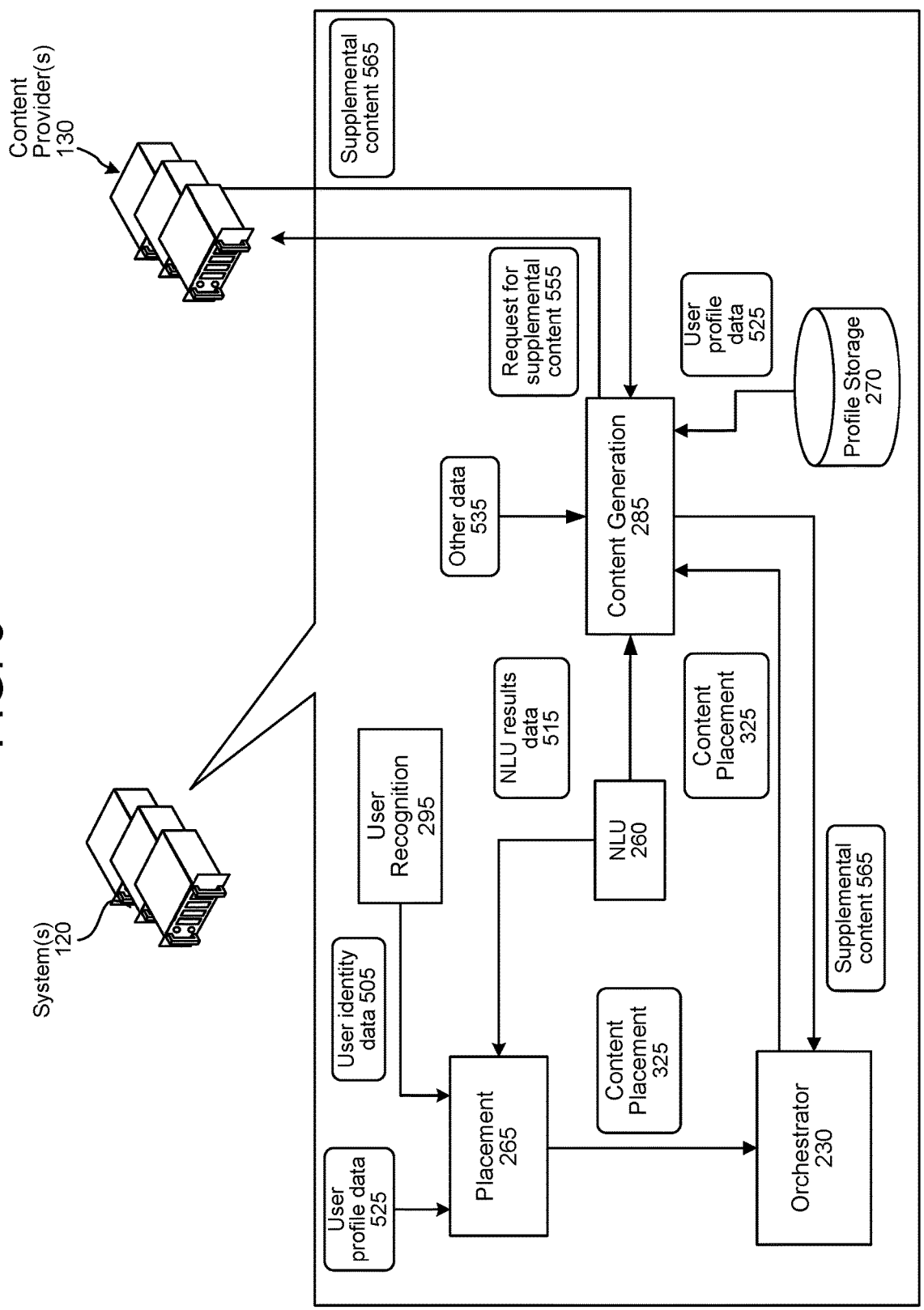
FIG. 5 is a conceptual diagram illustrating how a placement component and a content injection component may output supplemental content according to embodiments of the present disclosure.

FIG. 5 illustrates how the placement component 265 and the content generation component 285 may determine how supplemental content (e.g., associated with but not directly responsive to a natural language input) is output. In some embodiments, the placement component 265 is independent of the content generation component 285. The content placeholder generated by the placement component 265 may be used to define spatial/positional requirements for injecting unresponsive content during a user interaction, and to define other requirements for injecting content.

As illustrated, the various components in FIG. 5 communicate directly. It will be appreciated that some or all of the components illustrated in FIG. 5 may communicate through the orchestrator component 230. In addition, while FIG. 5 illustrates a dedicated placement component 265 and a content generation component 285, it will be appreciated that some or all of the processes performed by the components 265 and 285 disclosed herein may be performed by one or more other components of the system(s) 120, such as the orchestrator component 230.

Each time the NLU component 260 outputs NLU results data 515, the NLU results data 515 may be sent to the placement component 265. The placement component 265 may determine whether supplemental content unresponsive to the user input represented by the NLU results data 515, should be presented to the user 5.

The placement component 265 may receive data from a skill system(s) 125 indicating an output trigger in response to which supplemental content is to be presented. The placement component 265 may also receive constraint data from a skill system(s) 125 specifying how the supplemental content is to be presented. The placement component 265 may also receive multiple candidate content type for a particular output trigger, and the placement component 265 may determine, depending on the context data, which candidate content type should be used to generate the supplemental content for the output trigger. The placement component 265 may also receive data from a skill system(s) 125 indicating one or more optimization goals related to presenting supplemental content. In some embodiments, the placement component 265 may receive such data (e.g., output trigger, constraint data, candidate content types, optimization goals, etc.) from a system developer via other components or systems of the system 100.

A skill system(s) 125 may provide the system(s) 120 with data (represented as an output trigger) indicating that any time the NLU results data 515 includes a particular intent, the placement component 265 should determine whether supplemental content should be presented during the user interaction. For example, a concert ticket skill system may provide the system(s) 120 with data indicating that anytime the NLU results data 515 includes a <PlayMusic> intent, the placement component 265 should determine if supplemental content should be provided, where the injected content may be a ticket-sales content type (a first candidate content type) or may be a recommendation content type (a second candidate content type). Depending on the context data corresponding to the user input, the constraint data corresponding to presentation of the supplemental content, any optimization goals specified by the skill system 125, and other data, the placement component 265 may determine that supplemental content of the ticket-sales content type should be presented during the user interaction. In that case, the placement component 265 may send the content placement data 325 to the content generation component 285 along with a request to provide an output for the supplemental content. The content generation component 285 may query the concert ticket skill system to determine as to whether the concert ticket skill system has access to information indicating a concert put on by an artist represented in the NLU results data 515, and may generate the supplemental content 565 to be presented to the user 5.

For further example, an electronic calendar skill system may provide the system(s) 120 with data (represented as an output trigger) indicating that anytime the NLU results data 515 includes an <OutputTime> intent, the placement component 265 should determine if supplemental content should be provided. Depending on the context data corresponding to the user input, the constraint data corresponding to presentation of the supplemental content, any optimization goals specified by the skill system 125, and other data, the placement component 265 may determine that supplemental content from the electronic calendar skill system should be provided. In that case, the placement component 265 may send the content placement data 325 to the content generation component 285 along with a request to provide an output for the supplemental content, and the content generation component 285 may query the electronic calendar skill system as to whether the electronic calendar skill system has calendar entries associated with an electronic calendar associated with the natural language input-originating device 110 and/or user 5.

Yet further, for example, a traffic report skill system may provide the system(s) 120 with data (represented as an output trigger) indicating that anytime the NLU results data 515 includes a <BookRide> intent, the placement component 265 should determine if supplemental content relating to current/relevant traffic information should be presented.

The placement component 265 may additionally or alternatively determine when supplemental content should be presented to the user 5 based at least in part on data specific to the user 5 that provided the user input. Each user may have a different tolerance regarding how many times injected content is output in a given period of time, what kinds of supplemental content are output, as well as how supplemental content is presented.

The placement component 265 may receive user identity data 505 from the user recognition component 295. The user identity data 505 may indicate one or more users that likely provides the presently being processed natural language input. The placement component 265 may thereafter query the profile storage 270 for user profile data 525 specific to the user that most likely provided the presently being processed natural language input.

The user profile data 525 may indicate a maximum number of times the user 5 has indicated the system(s) 120 may output supplemental content in a specific period of time (e.g., twice/hour, ten (10) times/day, etc.). The maximum number of times may be irrespective to any specific skill system(s) 125, entity and/or represented in the NLU results data 515, or the like. For example, the user profile data 525 may indicate the system(s) 120 may output supplemental content a maximum of ten (10) times a day. If the placement component 265 determines the system(s) 120 has output supplemental content to the user 5 less than ten (10) times during a calendar day in which the present user interaction is taking place, the placement component 265 may send the content placement data 325 to the content generation component 285 to receive the supplemental content 565 to be presented to the user 5 during the user interaction. If the placement component 265 determines the system has already output supplemental content to the user 5 ten (10) times during the calendar data in which the present user interaction is taking place, the placement component 265 may not request the content generation component 285 to generate supplemental content data 565, thereby ending processing with respect to the output of supplemental content and thereby resulting in supplemental content not being output (in conjunction with the output/action responsive to the user input) by the system(s) 120.

The user profile data 525 may additionally or alternatively indicate a user preference regarding how often (e.g., a frequency) supplemental content associated with a content type may be output in a specific amount of time. Additionally or alternatively, the user profile data 525 may indicate a user preference regarding how often supplemental content may be output in a specific amount of time with respect to a content type corresponding to a user input. Content types include, but are not limited to, songs, news information, videos, concert ticket offers, shopping discounts, newly available skill systems, additional items available for purchase, recommendations, information on new skill/system functionalities, request for feedback/rating of the user interaction, and other content types. For example, a first user preference of a first user may indicate supplemental content corresponding to songs may be output up to ten (10) times a day, whereas a second user preference of a second user may indicate supplemental content corresponding to songs may be output up to two (2) times a week. For further example, a first user preference of a first user may indicate supplemental content may be output with regarding up to ten (10) user inputs corresponding to requests to play music in a single day whereas a second user preference of a second user may indicate supplemental content may be output regarding up to two (2) user inputs corresponding to requests to play music in a single a week.

The user profile data 525 may additionally or alternatively indicate a user preference regarding the times at which the user 5 permits the system(s) 120 to present supplemental content. For example, a user preference may indicate the system(s) 120 is permitted to output a first amount of supplemental content over the duration of a morning, and is permitted to output a second amount of supplemental content over the duration of an evening. The placement component 265 may determine whether or not supplemental content is presented based on the time when the present user interaction is occurring. If the placement component 265 determines the system(s) 120 has output supplemental content to the user 5 less times than permitted (as indicated by the user preference) for the time corresponding to the present user interaction, the placement component 265 may send the content placement data 325 to the content generation component 285 to generate the supplemental content data 565. If the placement component 265 determines the system(s) 120 has already output supplemental content a number of permitted times (as indicated by the user preference) for the time corresponding to the user interaction, the placement component 265 may not send the content placement data 325 to the content generation component 285.

The user profile data 525 may additionally or alternatively indicate a user preference regarding the types of user inputs with respect to which the user 5 permits, as well as does not permit, the system(s) 120 to output supplemental content. For example, the user preference may indicate the system(s) 120 may output supplemental content when the user interaction corresponds to an action to play music. For further example, the user preference may indicate the system(s) 120 may not output supplemental content when the user interaction corresponds to an action to purchase a product using a shopping skill system. If the placement component 265 determines an intent (included in NLU results data 515 representing a natural language input) corresponds to one with respect to which the system(s) 120 is permitted (as indicated by the user preference) to output supplemental content, the placement component 265 may send the content placement data 325 to the content generation component 285 to generate the supplemental content data 565. If the placement component 265 determines an intent (included in NLU results data 515 representing a natural language input) corresponds to one with respect to which the system(s) 120 is not permitted (as indicated by the user preference) to output supplemental content, the placement component 265 may not send the content placement data 325 to the content generation component 285.

The user profile data 525 may additionally or alternatively indicate various characteristics of the user 5. The user profile data 525 may indicate an age of the user 5, as users of different ages may be receptive to receiving different amounts and/or kinds of supplemental content. The user profile data 525 may additionally or alternatively indicate a culture of the user 5, as users of different cultures may be receptive to receiving different amounts and/or kinds of supplemental content. The user profile data 525 may additionally or alternatively indicate a geographic region, country, or other geographic location corresponding to the user's residence, as users residing in different geographic locations may be receptive to receiving different amounts and/or kinds of supplemental content. If the placement component 265 determines the characteristic(s) of the user 5 indicates supplemental content should be presented, the placement component 265 may send the content placement data 325 to the content generation component 285 to generate the supplemental content data 565. If the placement component 265 determines the characteristic(s) of the user 5 indicates supplemental content should not be output, the placement component 265 may not send the content placement data 325 to the content generation component 285.

The user profile data 525 may additionally or alternatively indicate a user preference regarding entities, represented in NLU results data 515, with respect to which supplemental content may be output. For example, a user preference may indicate the system(s) 120 may output supplemental content when the NLU results data 515 includes an entity corresponding to a particular sports team. For further example, a user preference may indicate the system(s) 120 may not output supplemental content when the NLU results data 515 includes an entity corresponding to a celebrity. If the placement component 265 determines at least one entity, represented in the NLU results data 515, corresponds to an entity with respect to which a user preference indicates supplemental content may be output, the placement component 265 may send the content placement data 325 to the content generation component 285 to generate the supplemental content data 565. If the placement component 265 determines at least one entity, represented in the NLU results data 515, corresponds to an entity with respect to which a user preference indicates supplemental content should not be output, the placement component 265 may not send the content placement data 325 to the content generation component 285.

The placement component 265 may additionally or alternatively use previously provided user feedback indicating the appropriateness of previously output supplemental content to determine when supplemental content is to be presented.

The content generation component 285 may generate the supplemental content based at least in part on information accompanying output data responsive to a user input, which may be determined and provided to the system(s) 120 by a skill system(s) 125. Such information is represented as other data 535 in FIG. 5. In addition to the output data, a skill system(s) 125 may provide the system(s) 120 with presentation framework data indicating, for example, the types of content (e.g., audio, image, video, etc.) represented in the output data (responsive to the user input) as well as one or more devices associated with the user input-originating user 5 that should be used to output the different types of content. The content generation component 285 may additionally or alternatively generate the supplemental content based at least in part on data specific to the user 5 that provided the user input.

The placement component 265 may run one or more machine learned models that may take as input one or more of the data/information detailed above, and determine whether supplemental content should be presented during a particular user interaction. The model(s) run by the placement component 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as one employed by the placement component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The model(s) run by the placement component 265 may include skill system-specific rules. Thus, if the NLU results data 515 is associated with a specific skill system, the model(s) may execute skill system-specific rules that are associated with the skill system to which the NLU results data 515 is associated. For example, the model(s) may include music skill system-specific rules that indicate supplemental content should never be output when the music skill system is represented in NLU results data 515 since the output of the music skill system is long form music content.

In examples where a single model having skill system-specific portions is implemented, a portion of the model(s) specific to one or more skill systems may be considered static because the portion may remain constant overtime.

The model(s) run by the placement component 265 may additionally or alternatively be personalized to the input-originating user, at runtime. That is, the model(s) may be trained to consider a variety of information and, at runtime, the placement component 265 may run the model(s) with respect to a variety of information specific to the input-originating user 5.

A user may provide the system(s) 120 with feedback regarding the appropriateness of output supplemental content. Such feedback may be positive or negative. Moreover, a user may provide feedback to the system(s) 120 by speaking the feedback to the device 110*a*, by interacting with a touchscreen of the device 110*b*, by performing a gesture (e.g., thumbs up, thumbs down, etc.) that is captured by a camera of the device 110*a*/110*b*, providing a facial expression (e.g., a smile, a frown, etc.) that may be captured by a camera of the device 110*a*/110*b*, etc. The system(s) 120 may train or retrain the model(s), implemented by the placement component 265, using the provided feedback so the placement component 265 determines to not present supplemental content if the current context corresponds to a previous context where the provided feedback indicated the supplemental content was not applicable to the user or otherwise inappropriate or not-well received from the user's perspective.

The placement component 265 may generate and output content placement data 325 indicating how the supplemental content and what type of supplemental content should be presented. The placement component 265 may send the content placement data 325 to the content generation component 285. The content generation component 285 may send a request for supplemental content 555 to the content provider(s) 130, where the request is for supplemental content of the type indicated in the content placement data 325. In some embodiments, the skill systems may include a content generation skill system 125*a* specifically configured to determine the substance of the supplemental content, and the content generation component 285 may send the request for supplemental content to the content generation skill system 125*a*. The request for supplemental content 555 may include at least a portion of the NLU results data 515, and optionally at least a portion of the user profile data 525 and/or at least a portion of the other data 535.

The content generation component 285 may send the request for supplemental content 555 to a specific skill system(s) 125 or a specific content provider(s) 130, for example one corresponding to the content type indicated in the content placement data 325. As described above, a skill system(s) 125 may provide the system(s) 120 with data indicating that any time the NLU results data 515 indicates a particular intent, the placement component 265 should inject content related to that skill system(s) 125. When the placement component 265 determines the NLU results data 515 indicates the particular intent, the content generation component 285 may query the specific skill system(s) 125 for supplemental content corresponding to the user interaction and based on the content placement data 325.

The content generation component 285 may determine a content provider(s) 130 from which to receive supplemental content based at least in part on the NLU results data 515 and the content placement data 325. For example, the content generation component 285 may determine the NLU results data 515 includes a <PlayMusic> intent and "Adele" as an entity. Based thereon, the content generation component 285 may determine a concert booking content provider(s) 130 from which to receive supplemental content, where the supplemental content may relate to concert tickets for the artist Adele.

The content generation component 285 (or, alternatively for example, the orchestrator component 230) may send, to the content provider(s) 130, a request 555 for supplemental content. In at least some examples, the request 555 may indicate at least a portion of the entities represented in the NLU results data 515 that the content provider(s) 130 may use to determine supplemental content. The system(s) 120, in at least some examples, may determine first output data, responsive to the user input, prior to determining the content provider(s) 130 from which to receive supplemental content. Alternatively, the system(s) 120 may determine the content provider(s) 130, from which to receive supplemental content, after determining the NLU results data 515 but prior to determining the first output data.

The content provider(s) 130 may provide the content generation component 285 with supplemental content 565. In some cases, the supplemental content 565 may be associated with but not directly responsive to the user input. In some cases, the supplemental content 565 may be unresponsive to the user input and may not relate to the action to be performed in response to the user input. In at least some examples, the content provider(s) 130 may be unable to determine supplemental content. In such examples, the content provider(s) 130 may provide the content generation component 285 with an indication of such.

The content generation component 285 may, in at least some examples, determine a modality that supplemental content should be output in. The modality may be represented in the user profile data 525 input to the content generation component 285. For example, the user profile data 525 may indicate a user preference indicating that the user 5 prefers the system(s) 120 to output supplemental content in a visual format over an audio format. In such a case, the request 555 may include a request for the supplemental content in the form of image data or video data if such can be obtained or generated by the content provider(s) 130.

In some embodiments, the content generation component 285 may send a request 555 to more than one content provider(s) 130. The content generation component 285 may receive supplemental content from the one or more queried content providers 130. Each portion of supplemental content, sent to the content generation component 285, may be associated with a content provider identifier corresponding to the content provider(s) 130 that provided the portion of supplemental content.

When supplemental content is received from multiple content provider(s) 130, the placement component 265 or another component, such as the orchestrator 230 or the content generation component 285, may select which supplemental content to present to the user based on various factors indicating by the context data (based on the user identity data 505, the NLU results data 515, the user profile data 525, and/or the other data 535 described above with respect to FIG. 5), context data related to the user interaction, optimization goals indicated by the skill system(s) 125 corresponding to or associated with the supplemental content, and other factors.

After receiving the supplemental content 565, the content generation component 285 may cause the device 110 to output the supplemental content 565. For example, the content generation component 285 may send the supplemental content 565 to the orchestrator component 230, which may send the injected content 565 to the device 110 for output.

In at least some examples, the supplemental content is to be output as audio, and the supplemental content sent from the content generation component 285 to the orchestrator component 230 is text. In such examples, the orchestrator component 230 may send the text to the TTS component 280. The TTS component 280 may perform TTS processing on the text to generate synthesized speech corresponding to the unresponsive text. The TTS component 280 may send the synthesized speech to the orchestrator component 230, which may thereafter send the synthesized speech to the device 110 for output. The orchestrator component 230 may combine data representing an output/action responsive to a user input and data representing the supplemental content 565 prior to sending output data to the device 110 for presentation to the user.

Figure 6:
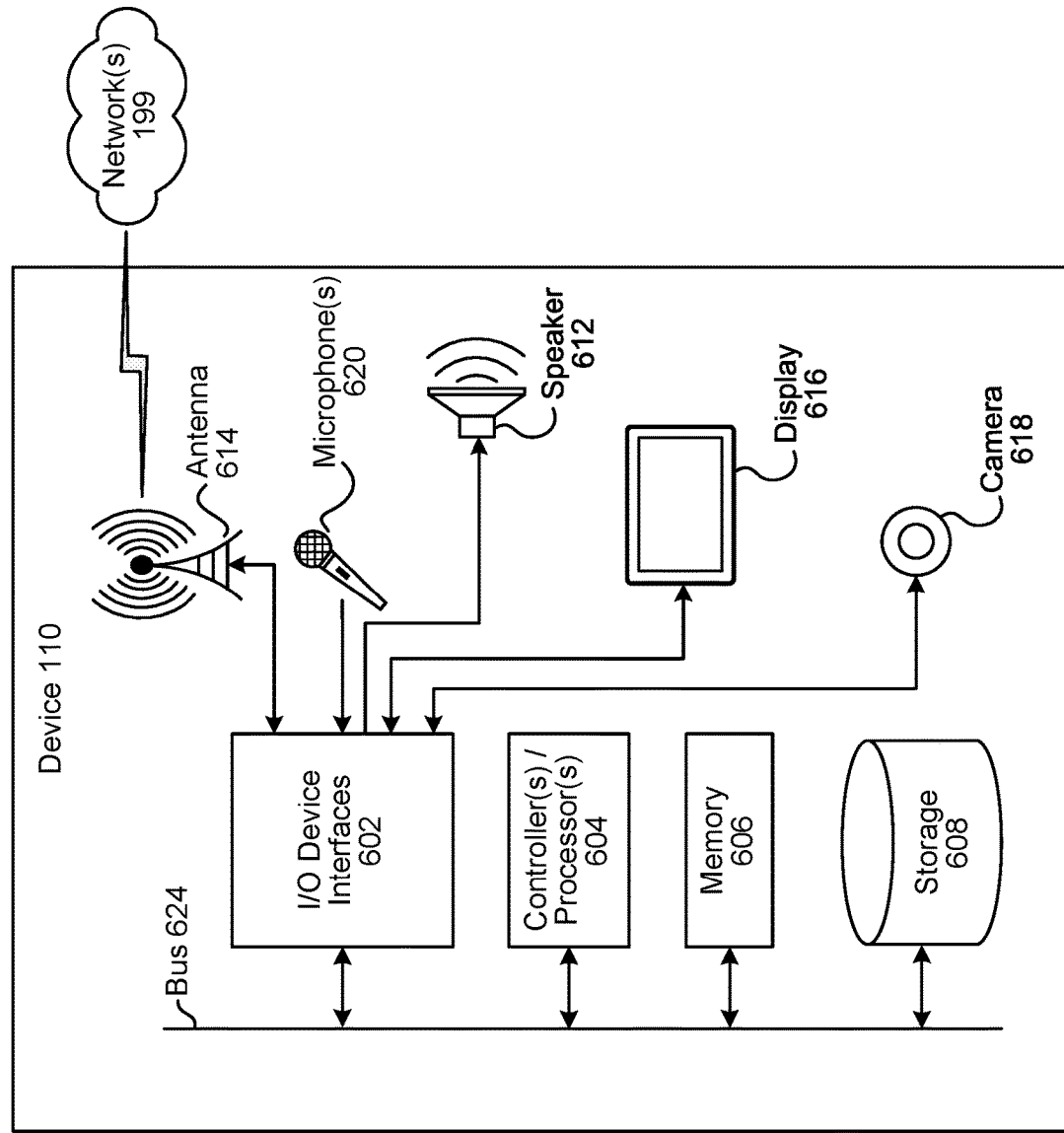
FIG. 6 is a block diagram conceptually illustrating example components of a device according to embodiments of the present disclosure.
Figure 7:
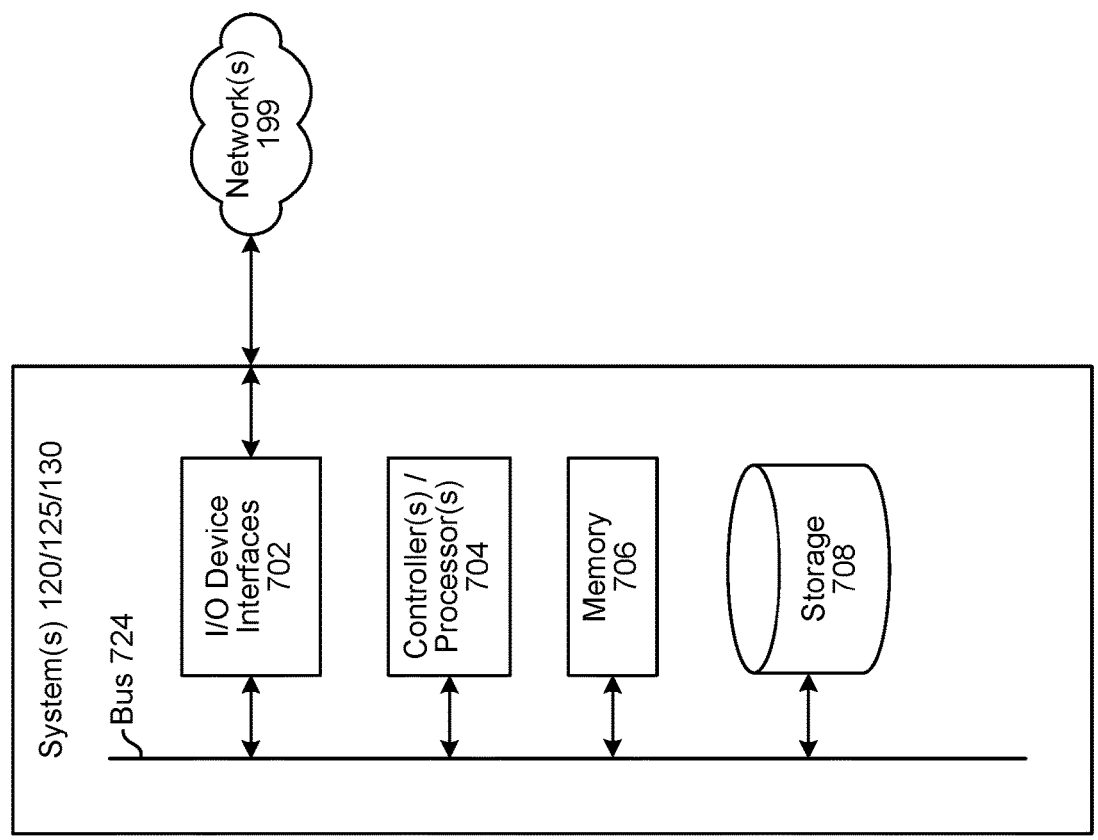
FIG. 7 is a block diagram conceptually illustrating example components of a system according to embodiments of the present disclosure.

FIG. 6 is a block diagram conceptually illustrating a device 110 that may be used with the system. FIG. 7 is a block diagram conceptually illustrating example components of a remote device, such as the natural language processing system(s) 120, which may assist with ASR processing, NLU processing, etc.; a skill system(s) 125; and a content provider(s) 130. A system (120/125/130) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125/130) may be included in the overall system 100 of the present disclosure, such as one or more natural language processing systems 120 for performing ASR processing, one or more natural language processing systems 120 for performing NLU processing, one or more skill systems 125, one or more content providers 130, etc. In operation, each of these systems may include computer-readable and computer-executable instructions that reside on the respective device (120/125), as will be discussed further below.

Each of these devices (110/120/125/130) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125/130) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125/130) may also be connected to removable or external non-volatile memory and/or storage (such as a removable memory card, memory key drive, networked storage, etc.) through respective input/output device interfaces (602/702).

Computer instructions for operating each device (110/120/125/130) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125/130) includes input/output device interfaces (602/702). A variety of components may be connected through the input/output device interfaces (602/702), as will be discussed further below. Additionally, each device (110/120/125/130) may include an address/data bus (624/724) for conveying data among components of the respective device. Each component within a device (110/120/125/130) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device 110, the natural language processing system(s) 120, a skill system(s) 125, and/or a content provider(s) 130 may include their own dedicated processors, memory, and/or storage. Alternatively, one or more of the components of the device 110, the natural language processing system(s) 120, a skill system(s) 125, and/or a content provider(s) 130 may utilize the I/O interfaces (602/702), processor(s) (604/704), memory (606/706), and/or storage (608/708) of the device(s) 110, natural language processing system(s) 120, the skill system(s) 125, or the content provider(s) 130, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system(s) 120, a skill system(s) 125, and a content provider(s) 130, as described herein, are illustrative, and may be located as a stand-alone device or may be included, in whole or in part, as a component of a larger device or system.

Figure 8:
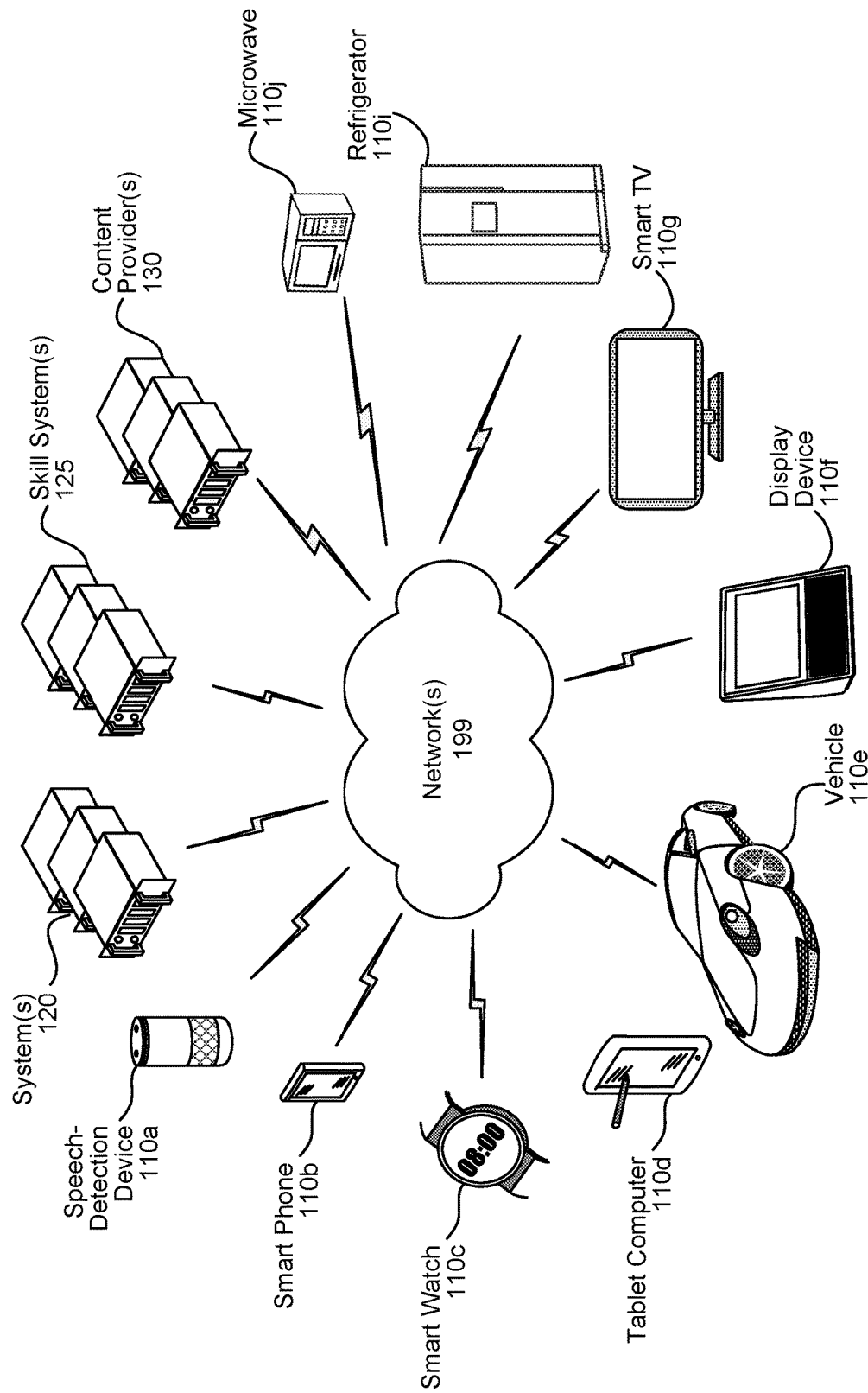
FIG. 8 illustrates an example of a computer network for use with the overall system.

As illustrated in FIG. 8, multiple devices (110a-110i, 120, 125, 130) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a refrigerator 110h, and/or a microwave 110i may be connected to the network(s) 199 through a wireless service provider, over a WiFi or cellular network connection, or the like. Other devices are included as network-connected support devices, such as the natural language processing system(s) 120, the skill system(s) 125, the content provider(s) 130, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   during a first time period:
     receiving trigger data representing an action to be performed using a skill system;
     determining that performance of the action triggers output of first content that is unresponsive to a first user input;
     receiving, from the skill system, constraint data corresponding to the first content, the constraint data indicating a device type and a time duration;
     determining, using the constraint data, content placement data indicating when the first content is to be presented during a user interaction; and
     associating the trigger data with the content placement data; and
   during a second time period after the first time period:
     receiving, from a device, audio data representing an utterance;
     determining that an intent associated with the utterance corresponds to performance of the action;
     determining first output data corresponding to performance of the action, the first output data responsive to the utterance;
     determining, using the trigger data, that the first content is to be presented, the first content being unresponsive to the utterance;
     sending the content placement data to the skill system;
     receiving, from the skill system, second output data representing the first content;
     determining that the device is associated with the device type;
     determining that a current time is within the time duration;
     sending the first output data to the device; and
     sending the second output data to the device for output after the first output data.

2. The computer-implemented method of claim 1, further comprising:
   during the first time period:
     receiving a second user input from a second device;
     determining that the second user input corresponds to a first sequence of performing a first action prior to performing a second action when an event occurs;
     determining that performance of the first action triggers second content that is unresponsive to the second user input; and
     determining a second sequence of performing the first action, presenting the second content after performance of the first action, and performing the second action after presenting the second content; and
   during the second time period:
     receiving event data;
     determining that the event data triggers the second sequence;
     determining third output data corresponding to performance of the first action;
     determining fourth output data corresponding to the second content;
     determining fifth output data corresponding to performance of the second action;
     sending the third output data to the second device;
     sending the fourth output data to the second device; and
     sending the fifth output data to the second device.

3. The computer-implemented method of claim 1, further comprising:
   during the first time period:
     receiving, from the skill system, a first indication of a first content type corresponding to the first content; and
     receiving, from the skill system, a second indication of a second content type corresponding to the first content;
   during the second time period:
     receiving profile data associated with the utterance;
     determining, using the profile data, that the first content type results in receipt of an additional user input; and
     determining the content placement data to include an identifier associated with the first content type,
     wherein receiving the second output data from the skill system comprises receiving the second output data corresponding to the first content type.

4. A method comprising:
   receiving action data corresponding to an action to be performed in response to a user input received from a device;
   determining, using trigger data, to present supplemental content separate from and in addition to performance of the action, wherein the trigger data indicates the supplemental content is to be output in response to performance of the action corresponding to an action type;
   receiving constraint data indicating at least one of a device type and a time duration;
   determining at least one of:
     the device is associated with the device type, and
     a current time is within the time duration;
   based at least in part on determining at least one of the device is associated with the device type and the current time is within the time duration, determining the constraint data permits output of the supplemental content;
   determining, based at least in part on the constraint data permitting output of the supplemental content, placement data representing when the supplemental content is to be presented with respect to performance of the action; and determining output data including the action data and the placement data, the output data to be used to generate an output in response to the user input.

5. The method of claim 4, further comprising:

receiving, from the device, a second user input;

determining that an intent associated with the second user input corresponds to performance of the action;

determining second output data corresponding to performance of the action, the second output data responsive to the second user input;

determining, using the output data, that output of supplemental content in addition to performance of the action is triggered;

receiving third output data representing the supplemental content;

sending the second output data to the device; and sending the third output data to the device for output after the second output data.

6. The method of claim 4, further comprising:

determining that the user input corresponds to an intent to perform a first action and a second action, wherein receiving the action data comprises receiving a first output sequence representing performance of the first action prior to performance of the second action;

determining a second output sequence representing performance of the first action prior to presenting the supplemental content and performance of the second action after presenting the supplemental content; and determining the output data to include the second output sequence.

7. The method of claim 4, further comprising:

receiving a second user input associated with a user profile;

determining that the second user input corresponds to the action type;

determining that the action type corresponds to generation of unresponsive content;

receiving context data corresponding to the second user input;

determining, using the context data, to not present the unresponsive content; and generating second output data responsive to the second user input.

8. The method of claim 4, further comprising:

determining a first skill capable of performing the action responsive to the user input;

receiving, from the first skill, a first content type corresponding to the supplemental content;

receiving, from a second skill, a second content type corresponding to the supplemental content; and determining the placement data to include an identifier associated with the second content type.

9. The method of claim 4, further comprising:

sending the placement data to a first content provider system;

receiving, from the first content provider system, second output data corresponding to the supplemental content;

sending the placement data to a second content provider system;

receiving, from the second content provider system, third output data corresponding to the supplemental content;

receiving user profile data associated with the user input; and determining, using the user profile data, to present the second output data as the supplemental content.

10. The method of claim 4, further comprising:

receiving user profile data associated with the user input;

determining a first content type corresponding to the supplemental content;

determining a second content type corresponding to the supplemental content;

determining, using the user profile data, that the first content type results in receipt of an additional user input; and determining the placement data to include an identifier associated with the first content type.

11. The method of claim 4, further comprising:

determining second output data corresponding to performance of the action;

determining, using the placement data, third output data corresponding to the supplemental content;

sending the second output data to the device; and sending the third output data to the device.

12. The method of claim 4, further comprising:

determining, using the output data, to send a first output to the device, the first output representing performance of the action;

determining, using the placement data, a second output representing the supplemental content; and determining, using the output data, to send the second output to the device after sending the first output.

13. A system comprising:

at least one processor; and at least one memory comprising instructions that, when executed by the at least one processor, cause the system to:

receive action data corresponding to an action to be performed in response to a user input received from a device;

determine, using trigger data, to present supplemental content separate from and in addition to performance of the action, wherein the trigger data indicates the supplemental content is to be output in response to performance of the action corresponding to an action type;

receive constraint data representing at least one condition for content;

determine the constraint data permits output of the supplemental content;

determine, based at least in part on the constraint data permitting output of the supplemental content, placement data representing when the supplemental content is to be presented with respect to performance of the action;

determine first output data including the action data and the placement data, the first output data to be used to generate an output in response to the user input;

determine, using the first output data, to send second output data to the device, the second output data representing performance of the action;

determine, using the placement data, third output data representing the supplemental content; and determine, using the first output data, to send the third output data to the device after sending the second output data.

14. The system of claim 13, wherein the at least one memory further comprises instructions that, when executed by the at least one processor, further cause the system to:

receive, from the device, a second user input;

determine that an intent associated with the second user input corresponds to performance of the action;

determine fourth output data corresponding to performance of the action, the fourth output data responsive to the second user input;

determine, using the first output data, that output of supplemental content in addition to performance of the action is triggered;

receive fifth output data representing the supplemental content;

send the fourth output data to the device; and send the fifth output data to the device for output after the fourth output data.

15. The system of claim 13, wherein the at least one memory further comprises instructions that, when executed by the at least one processor, further cause the system to:

determine that the user input corresponds to an intent to perform a first action and a second action, wherein the instructions that cause the system to receive the action data further cause the system to receive a first output sequence representing performance of the first action prior to performance of the second action;

determine a second output sequence representing performance of the first action prior to presenting the supplemental content and performance of the second action after presenting the supplemental content; and determine the first output data to include the second output sequence.

16. The system of claim 13, wherein the at least one memory further comprises instructions that, when executed by the at least one processor, further cause the system to:

receive a second user input associated with a user profile;

determine that the second user input corresponds to the action type;

determine that the action type corresponds to generation of unresponsive content;

receive context data corresponding to the second user input;

determine, using the context data, to not present the unresponsive content; and generate fourth output data responsive to the second user input.

17. The system of claim 13, wherein the at least one memory further comprises instructions that, when executed by the at least one processor, further cause the system to:

determine a first skill capable of performing the action responsive to the user input;

receive, from the first skill, a first content type corresponding to the supplemental content;

receive, from a second skill, a second content type corresponding to the supplemental content; and determine the placement data to include an identifier associated with the second content type.

18. The system of claim 13, wherein the at least one memory further comprises instructions that, when executed by the at least one processor, further cause the system to:

send the placement data to a first content provider system;

receive, from the first content provider system, the third output data representing the supplemental content;

send the placement data to a second content provider system;

receive, from the second content provider system, fourth output data corresponding to the supplemental content;

receive user profile data associated with the user input; and determine, using the user profile data, to present the third output data as the supplemental content.

19. The system of claim 13, wherein the at least one memory further comprises instructions that, when executed by the at least one processor, further cause the system to:

receive user profile data associated with the user input;

determine a first content type corresponding to the supplemental content;

determine a second content type corresponding to the supplemental content;

determine, using the user profile data, that the first content type results in receipt of an additional user input; and determine the placement data to include an identifier associated with the first content type.

\* \* \* \* \*